(12) United States Patent
Tuscano et al.

(10) Patent No.: US 12,033,138 B2
(45) Date of Patent: Jul. 9, 2024

(54) AUTOMATIC MANAGEMENT OF DIGITAL MEDIA

(71) Applicant: PearPop, Inc., Los Angeles, CA (US)

(72) Inventors: Vincent D. Tuscano, Los Angeles, CA (US); Cole A. Mason, Los Angeles, CA (US); Raymond R. Lee, Los Angeles, CA (US)

(73) Assignee: PearPop Inc., Los Angeles, CA (US)

( * ) Notice: Subject to any disclaimer, the term of this patent is extended or adjusted under 35 U.S.C. 154(b) by 0 days.

(21) Appl. No.: 17/381,070

(22) Filed: Jul. 20, 2021

(65) Prior Publication Data
US 2023/0024951 A1      Jan. 26, 2023

(51) Int. Cl.
*G06Q 30/00*     (2023.01)
*G06Q 20/36*     (2012.01)

(52) U.S. Cl.
CPC ............... *G06Q 20/3678* (2013.01)

(58) Field of Classification Search
CPC .............................................. G06Q 20/3678
USPC ............ 705/41, 1.1, 39, 14.1, 50, 66, 310; 715/229, 212, 734; 707/610, 740, 679
See application file for complete search history.

(56) References Cited

U.S. PATENT DOCUMENTS

| 10,402,465 B1 | 9/2019 | Jain | |
|---|---|---|---|
| 2014/0089322 A1* | 3/2014 | Garcia | G06F 16/9535 707/748 |
| 2017/0185611 A1 | 6/2017 | Hurwitz | |
| 2018/0357729 A1* | 12/2018 | Farnham | G06Q 30/0279 |
| 2021/0150541 A1* | 5/2021 | Gurbuxani | G06N 3/08 |

OTHER PUBLICATIONS

ProQuestDialogNPL Search History.*
Long, Jonathan, "4 Tips to Turn Social Media Content Creation into a Full-Time Career", Entrepreneur, https://www.enterpresneur.com/article/296466, Jun. 29, 2017, 9 pages.
ProQuestDialogNPL Search History, from U.S. Appl. No. 17/836,914, 3 pages.

* cited by examiner

*Primary Examiner* — John H. Holly
(74) *Attorney, Agent, or Firm* — Baker Botts L.L.P.

(57) ABSTRACT

In an embodiment, the present disclosure provides computer-implemented systems and methods for automatic management of video content of a plurality of content creators. In an embodiment, the disclosure provides, among other things, computers programmed to implement a networked, online platform for facilitating collaboration between content creators and producers. In an embodiment, the platform is programmatically configured to provide a content creator with a Challenge function that includes a challenge management system with automated messaging and a reward system. In an embodiment, the platform is also programmatically configured to implement a Broadcast function useful to a content creator. In an embodiment, the platform is programmed to implement the foregoing functions using complete, defined workflows that efficiently facilitate collaboration among content creators via the Challenge function or the Broadcast function.

18 Claims, 7 Drawing Sheets

AUTOMATIC MANAGEMENT OF DIGITAL MEDIA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2021 PearPop Inc.

TECHNICAL FIELD

One technical field is automatic management of digital media assets, including video content, sound, images, and other digital media assets. Another technical field is platforms and tools for digital content creation, editing, and distribution.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today's technology enables the creation and sharing of a vast array of digital content with an unprecedent number of consumers. Video recording artists, for example, can reach audiences spread across the globe and short-form video recording and sharing applications such as TIKTOK and INSTAGRAM have become widely successful. However, emerging content creators who are seeking to increase the number of accounts that follow them must compete for media views with an ever-growing constellation of celebrities who are also recording digital media. Meanwhile, consumer attention spans and time remain limited.

On the other hand, content creators who are seeking to monetize even a sizable number of follower accounts face challenges in converting a large following into a regular income stream. Partnering with advertisers may be inefficient and logistically challenging, sometimes requiring the assistance of a manager or agent and attendant costs. Moreover, the most lucrative partnership contracts that provide for a more long-term and regular income stream often go to a relatively select set of celebrity content creators. These issues are exacerbated when content creators with diverse bases of follower accounts desire to collaborate to produce digital creative works. Tools to facilitate and automate end-to-end collaboration and management of digital media assets are lacking. If a solution could be developed that addressed the aforementioned issues, then it would represent a significant advance in the state of the art.

SUMMARY

The appended claims may serve as a summary of the invention.

DETAILED DESCRIPTION

Figure 1:
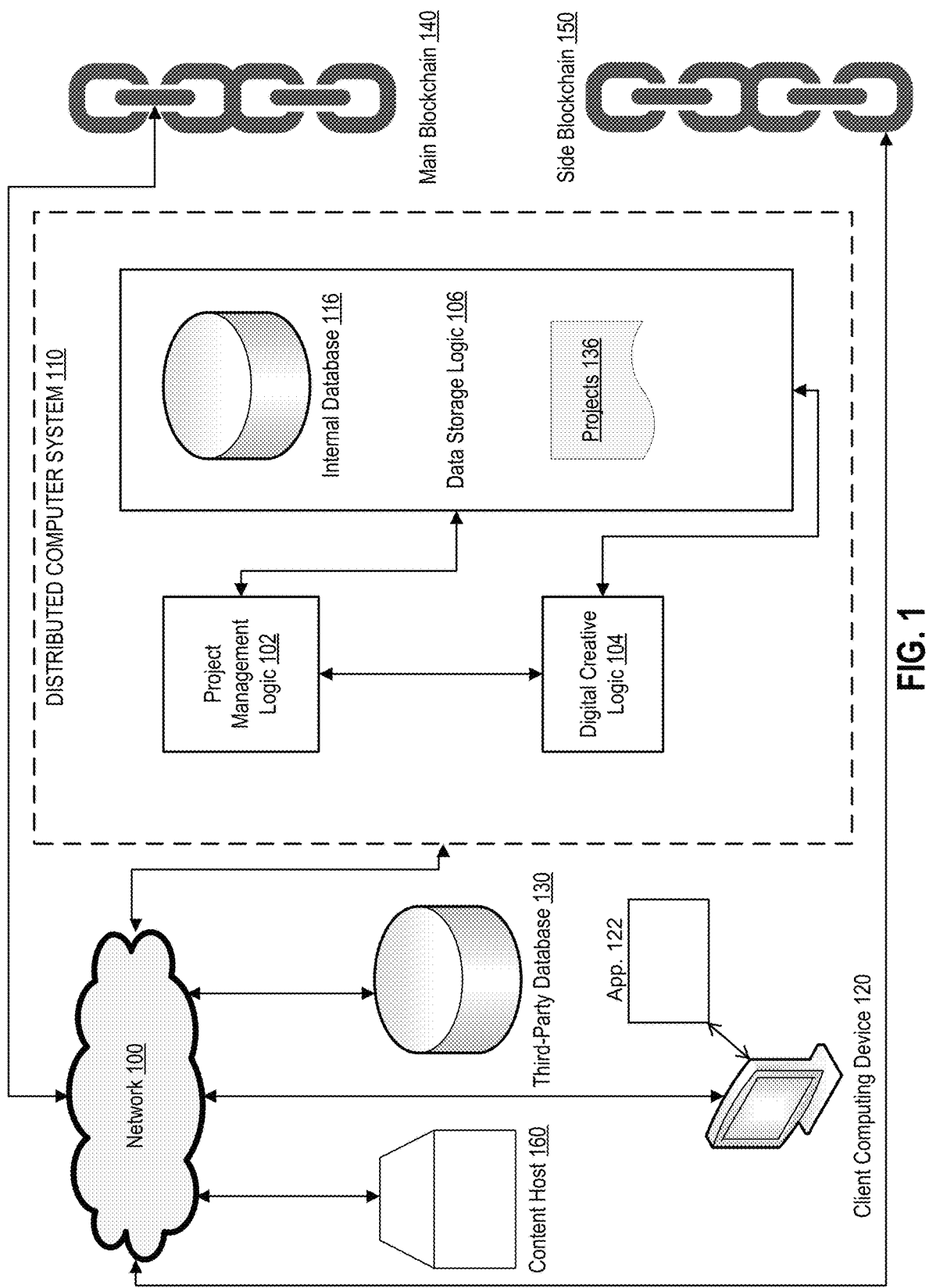
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
 1. General Overview
 2. Structural & Functional Overview
   2.1 Challenge function
   2.2 Broadcast function
 3. Implementation Example—Hardware Overview
 1. General Overview In an embodiment, the disclosure provides computer-implemented systems and methods for automatic management of video content of a plurality of content creators. In an embodiment, the disclosure provides computers programmed to implement a networked, online platform for facilitating collaboration between content creators and producers. "Platform," in this context, refers to a combination of a server-side application and a client-side application that execute independently but communicate and interoperate to execute substantive functions as further described herein. Collaboration, in this context, may include message communications, facilities for recording short-form videos or other media, and sharing the media. The platform may provide software tools, accessible using mobile computing devices or other computers, for digital content creation, editing, and distribution. These tools may interoperate with computer-implemented digital payment services, and recommendation algorithms that are programmed, in part, to execute targeted association of content creators capable of collaborative recording with others and/or forming a mutually beneficial relationship with others.

In an embodiment, the platform is programmatically configured to provide a content creator with a Challenge function that includes a challenge management system with automated messaging and a reward system. In this context, a "challenge" may be a series of electronic messages, the timing and content of which are mediated by programmed algorithms, that are configured to induce an account or individual to record a video recording in association with a specified account or individual.

In one embodiment, a content creator may initiate a challenge by interactively communicating with the challenge management system to identify a digital content item, such as a short-form video recording, and uploading it to a server computer that implements a storage, distribution, mediation, and payment platform. The challenge is defined in part using a set of challenge criteria, which may comprise fixed rewards or tiered reward goals. The reward system may be programmed to automatically reward other content creators who, achieve a certain amount of views of the digital content item, or produce a new digital content item that is associated with the identified digital content item through a collaboration. The Challenge may specify that the content item must be used in producing a video recording, a sound recording, a multi-party audiovisual recording, or another type of digital content. Consequently, the Challenge function provides the technical benefit of more efficient production of audiovisual recordings for a content management system by reducing the difficulty of finding content with which to collaborate and implementing an automated workflow that leads a user or account through the process of recording.

In an embodiment, the platform is also programmatically configured to implement a Broadcast function useful to a content creator. For a specified digital content item, the content creator may set broadcast criteria and initiate a broadcast, thus causing the platform to transmit a request of the content creator to collaborate with other users or accounts concerning the digital content item. The digital content item may be a video recording, a sound, a multi-party audiovisual recording, or another type of digital content. The broadcast criteria may comprise a budget, a content category, and a desired number of followers associated with the sought broadcast partner. The broadcast function may allow content creators without a large existing set of follower accounts to increase the number of follower accounts by distributing the digital content item in collaboration with content creators who have larger and/or more active networks of follower accounts.

In an embodiment, the platform is programmed to implement the foregoing functions using complete, defined workflows that efficiently facilitate collaboration among content creators via the Challenge function or Broadcast function. In an embodiment, the platform is programmed with routines, functions, or tools for producing, editing, remixing, and storing digital content. In embodiments, the platform may communicate, using API calls or other programmatic interfaces, with social media sites where collaborative content is hosted or displayed. In an embodiment, the platform is programmed to process electronic payments related to challenges and broadcasts, using secure digital wallets and blockchain recordation of transactions. In some embodiments, payment may be collected or distributed in the form of Ether (ETH), bitcoins, another cryptocurrency, conventional currency, or platform-specific tokens.

In an embodiment, a computer implemented method includes receiving, from a first platform user, a specification of a file comprising digital content, the specification being associated with challenge settings including at least a start date, an end date, a budget, a challenge type, and challenge criteria comprising a reward amount. The challenge setting may be digitally published, online. A link comprising a pointer to a digital object comprising the digital content may be received from a second platform user, the digital object being hosted online by a host website. The link may be programmatically verified using an automatically-scheduled API call to the host website. Verification can involve checking that metadata associated with the digital object at the link satisfies the challenge criteria associated with the challenge settings. The metadata may be at least one of a number of views or a number of likes of the digital object. After verifying that the metadata associated with the digital object at the link satisfies the challenge criteria a reward may be distributed to a financial account of the second platform user.

In an embodiment, the challenge settings may be digital published online in a list of live Challenges in a Challenge Feed, the list of live Challenges specifically curated to the second platform user based on determinations made by a machine learning algorithm operating on a graph, content types and content creators being represented as nodes on the graph and an increase in followers of a second content creator being modeled as a flow from a first content creator node to a second content creator node.

In an embodiment, the second platform user creates the digital object using tools provided by a platform on which the first platform user and the second platform user each have a respective user account, the tools comprising at least one of video editing tools, sound editing tools, image editing tools, text editing tools, markup tools, post-production tools, file compression tools, metadata editing tools, tools for creating subtitles, or tools for creating closed captioning (CC).

In an embodiment, the challenge type may be one of a duet, a stitch, a sound, or a comment.

In an embodiment, the challenge criteria may be tiered reward goals.

In an embodiment, the reward is deposited into a digital wallet associated with a user account of the second platform user, the user account associated with a platform, and the reward comprising Ether, Bitcoin, or a unique fungible token native to the platform.

In an embodiment, a computer-implemented method includes receiving, from a first user, a specification of a file including digital content, the specification being associated with Broadcast buy criteria comprising a desired host platform type, a desired collaboration type, a desired follower range, and a budget. Broadcast sell settings may be received from a second user. The Broadcast sell settings may include one or more sets of parameters, each set including at least a price corresponding to both a collaboration type and a host platform type, a compatible set of the one or more sets of parameters comprising the desired host platform type and the desired collaboration type, the price of the compatible set being less than or equal to the budget, and a follower count of the second user on the desired host platform type being within the desired follower range. A notification comprising a name of the second user and the compatible set of parameters may be transmitted to the first user. Input signaling an acceptance of the name of the second user and the compatible set of parameters may be received from the first user. A verification link comprising a pointer to a digital object may be received from the second user. It may be verified that the digital object pointed to by the verification link includes a digital content composition including the specified digital content, that the digital object is being hosted on the host platform type, and that the digital content composition is of the desired collaboration type. A payment may be distributed to a financial account of the second user.

In an embodiment, the desired follower range may be associated with the specification of the file by the first user dragging a slider in a GUI displayed on a display of a computing device of the first user, the slider comprising a left bound representing a minimum number of desired followers and a right bound representing a maximum number of desired followers, the slider being overlaid on a histogram depicting associated follower counts of content creators having digitally submitted Broadcast sell settings.

In a particular embodiment, a method may involve automatically populating, in a subframe of the GUI, a list of content creators associated with Broadcast sell settings that meet the Broadcast buy criteria, the list including miniature portraits of the content creators along with corresponding social media handles and associated follower counts.

In a particular embodiment, a method may involve automatically populating, in a subframe of a GUI displayed on a display of a computing device of the first user, a list of content creators associated with Broadcast sell settings that meet the Broadcast buy criteria, the list including miniature portraits of the content creators along with corresponding social media handles and follower counts.

In an embodiment, the content creators of the list of content creators being selected for display in the subframe of the GUI out of all content creators associated with Broadcast sell settings that meet the Broadcast buy criteria at least partly based on determinations made by a machine learning algorithm operating on a graph, content types and content creators being represented as nodes on the graph and an increase in followers of a second content creator being modeled as a flow from a first content creator node to a second content creator node.

In an embodiment, the content creators of the list of content creators may be selected for display in the subframe of the GUI out of all content creators associated with Broadcast sell settings that meet the Broadcast buy criteria at least partly based on content tags submitted by the first user designating one or more styles of the digital content.

In an embodiment, the collaboration type may be one of a duet, a stitch, a sound, or a comment.

2. Structural & Functional Overview

FIG. 1 illustrates a distributed computer system showing the context of use and principal functional elements with which one embodiment could be implemented. In an embodiment, distributed computer system 110 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1, for one embodiment, depicts a distributed computer system 110 coupled via network 100 to a client computing device 120, a third-party database 130, a main blockchain 140, a side blockchain 150, and a content host 160. In some instances, some of the depicted components may be communicatively coupled via a network 100 without the distributed computer system 110 positioned as an intermediary.

In an embodiment, computer system 110 is programmed to execute the functions described herein and related to automatic management of digital content items of a plurality of content creators and collaboration between groups of two or more content creators, as further described in other sections herein. Distributed computer system 110 may comprise one or more processors, cores, clusters, computers, servers, and/or virtual machine instances, hosted or executing in an enterprise, private datacenter, public datacenter and/or cloud computing service.

In some embodiments, the client computing device 120 may be a smartphone, laptop computer, desktop computer, tablet, or any other type of computing device comprising one or more hardware processors or processor cores. In one embodiment, client computing device 120 hosts and executes a client application or app 122, which the client computing device may download and install from computer system 110, an application store, or other repository. The app 122 is compatible with computer system 110 and communicates with the computer system using an app-specific protocol, parameterized HTTP POST and GET requests, and/or other programmatic calls. In some embodiments, app 122 comprises a conventional internet browser application that is capable of communicating over network 100 to other functional elements via HTTP and capable of rendering dynamic or static HTML, XML, or other markup languages, including displaying text, images, accessing video windows and players, and so forth.

In embodiments, the third-party database 130 may be an FTP site, cloud storage system, relational database, data lake, or other electronic digital system programmed for data storage, querying, and retrieval. In embodiments, the third-party database 130 is an InterPlanetary File System (IPFS). Database 130 may comprise networked storage in private or public cloud storage systems, file sharing systems, network attached storage, and so forth.

The main blockchain 140 and side blockchain 150, in one embodiment, are implemented using ETHEREUM blockchain technology, but other embodiments may use other kinds of blockchain technology. In embodiment, the side blockchain 150 has lower transaction costs than the main blockchain 140; the side blockchain 150 may have zero or de minimis transaction costs.

In an embodiment, the content host 160 is a social media content sharing computer, service or website that is programmed to receive, store and host audiovisual programs, such as short-form user-created videos that are uploaded to content host 160 from mobile computing devices, desktop computers, or other devices. Presently known commercial examples include TIKTOK and INSTAGRAM, but other embodiments may use functionally equivalent or functionally similar services of other providers. A video, audiovisual program or recording, or other digital content item that the content host 160 hosts may be associated with metrics, such as a number of views or likes associated with the video, that are digitally stored in tables of the database 130, main memory of the computer system 110, or internal database 116. Metrics of this type may be obtained using programmatic means such as API calls, parameterized HTTP POST or GET requests, or calls or method invocations in application-specific protocols. In embodiments, digital content items that are uploaded to distributed computer system 110 may be automatically published to a content host 160. In embodiments, a link or pointer to digital content hosted by a content host 160, or the digital content itself, may be uploaded to distributed computer system 110 and stored in internal database 116 or third-party database 130.

In one embodiment, distributed computer system 110 comprises project management instructions or logic 102 that are programmed to interoperate with digital creation logic 104 and data storage logic 106 to execute the functions that are described herein. In an embodiment, instructions executed at distributed computer system 110 are organized as a web application which app 122 accesses via HTTP.

In an embodiment, when a user account uploads digital content items to computer system 110 from a client computing device 120, project management logic 102 is programmed to assign the digital content item to a particular project 136, which may have a unique project identifier (ID). The data storage logic 106 is programmed, in response, to cause the uploaded content to be stored in third-party database 130 or an internal database 116. The internal database 116 may an FTP site, cloud storage, relational database, data lake, or other system for data storage.

In some embodiments, project management logic 102 is programmed with user enrollment and account creation instructions that respond to input signals from client computing device 120 requesting to create a new user or account. In some embodiments, a request of a client computing device 120 to create a new user or account is transmitted with an electronic mail address or other unique identifier of a user or account, and in response, project management logic 102 is programmed to call an API of an external system to validate the user identifier and/or obtain security credentials for the user or account. Or, in some embodiments in which third-party systems do not provide usable credentials, user requests may be manually checked. For example, a new user may transmit a registration request that specifies a username that has been previously created in a third-party service such as TIKTOK. In response, project management logic 102 is programmed to generate a pseudo-randomly generated integer verification code, and to transmit a response message to the user instructing the user to add the verification code to their TIKTOK biography for manual verification by an administrator associated with distributed computer system 110 or an owner or operator of the system. The same method of verification may be used to ensure video requests are honored by a collaborator.

In an embodiment, data storage logic 106 is programmed for determining where data should be stored, for causing data to be stored and backed-up, and for executing transactions on the main blockchain 140 and the side blockchain 150. The project management logic 106 is programmed to implement version control and access control for files related to projects 136, including versions of compositions and contributed video, audio, digital imagery, and electronic text files. In embodiments, digital files related to challenges or broadcasts may be associated with projects 136 and stored in the internal database 116, the third-party database 130, or in another data storage system.

In an embodiment, the data storage logic 106 programmatically interoperates with digital creation logic 104. In an embodiment, the digital creation logic 104 is programmed to process files related to the creation of digital objects by content creators. A user account associated with the client computing device 120 may interactively use the digital creation logic 104 to create, produce, or mix digital content items for projects 136. The digital creation logic 104 is programmed, in various embodiments, to implement video editing tools, sound editing tools, image editing tools, text editing tools, markup tools, post-production tools, file compression or editing tools, metadata editing tools, tools for creating subtitles or closed captioning (CC), or other digital editing, production, remixing, or publication tools.

2.1 Challenge Function

Figure 2A:
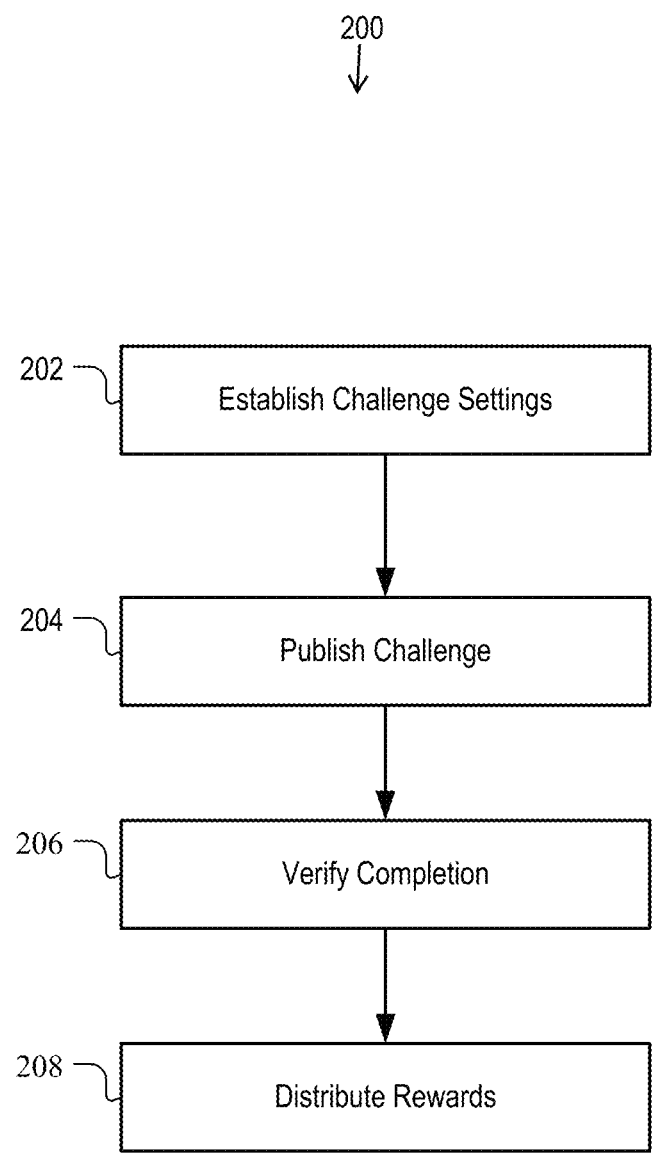
FIG. 2A illustrates an example process for issuing video recording Challenges from a buy-side perspective, in an embodiment.

FIG. 2A illustrates an example computer-implemented process for issuing Challenges from a buy-side perspective, in an embodiment. "Buy-side," in this context, refers to operations associated with creating and publishing the details of a Challenge, receiving data indicating completion of a Challenge, verification of completion, and distribution of electronic rewards. The Challenge process, as disclosed, solves the technical problem of how to minimize the number of digital messages that are transmitted, using less network bandwidth, to accomplish a logical connection of a content creator to another account that is capable of assisting with dissemination of a particular digital content item. The Challenge process provides ancillary benefits such as rewards as an incentive for transmission of certain network messages, but the fundamental purpose of the Challenge process is to establish digital communication links between devices, accounts, and/or user computers that did not previously exist, using an efficient transmission sequence of network messages.

FIG. 2A and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In FIG. 2A, in an embodiment, a Challenge issuance method 200 is programmed to start execution at step 202, at which a client computing device associated with a content creator establishes challenge settings by interactively communicating with the distributed computer system 110 using the client computing device 120 and app 122. For purposes of illustrating a clear example, in the following sections, the term "Challenge-issuer" identifies a particular user account, client computing device 120, and/or user that initially configures or issues a challenge. This term is used solely for brevity and convenience and is not required as a label in or element of an embodiment.

Establishing the Challenge settings may comprise app 122 receiving input signals indicating selecting a Challenge creation function, then other input identifying one or more first digital content items for content creators to use, remix, or fuse with one or more second digital content items of the other content creators. The digital content item that the Challenge-issuer identifies may be an audiovisual recording, a video file, an audio file, an electronic text file, or another type of digital file, stored at any of client computing device 120, content host 160, third-party database 130, or internal database 116. The digital content item may be selected by app 122 calling a file browser function of the operating system of the mobile computing device 120, for example, to facilitate selecting a file from local device storage or local app storage to cause uploading to the distributed computer system 110. Or, the digital content item may already be stored by the distributed computer system 110 in the internal database 116, or it may be stored in the third-party database 130 or another data storage system. Alternatively, the identified content may be uploaded in step 202 as the Challenge settings are determined by the Challenge-issuer.

At step 202, in an embodiment, the challenge settings comprise a selection of a type of collaborative digital content composition that the Challenge-issuer desires content creators to produce to complete the challenge (a "Challenge type"), such as a multi-party audiovisual recording or DUET, a stitch, a sound, a comment, or another composition type. In some embodiments, the multi-party audiovisual recording comprises a composite recording of a video identified by the Challenge-issuer in combination with a video created by the Challenge-accepter; side-by-side composite recording may be used. In an embodiment, a stitch comprises a video recording consisting of a video clip of a Challenge-issuer that is incorporated into a video recording created by the Challenge-accepter. The video recordings in these embodiments may be hosted, for example, at content host 160 or client computing device 120. In an embodiment, a comment involves the Challenge-accepter posting and sharing a comment on the Challenge-issuer's video using a social media service; commercial examples include INSTAGRAM, FACEBOOK, TWITTER and so forth. In embodiments, the Challenge involves the Challenge-accepter creating a video in which an audio file of the Challenge-issuer is played in the background. In such embodiments, a Challenge may require the Challenge-accepter to dance or act in a certain style or manner as described by the Challenge-issuer in a text, audio, or video description to complete the challenge.

In an embodiment, the Challenge function is programmed to execute reward functions and to enforce challenge criteria under automatic program control. In one implementation, challenge settings include challenge criteria specifying either an all-or-nothing reward goal or a tiered reward goal to be paid to content creators who complete the Challenge. In an embodiment, to satisfy a challenge, the Challenge-accepter must post, using a social media service, digital content that satisfies the challenge criteria. When the challenge criteria specify an all-or-nothing reward, to satisfy a challenge, to earn a reward, the Challenge-accepter must achieve a certain number of views and/or likes (e.g., 500 views, 5,000 views, 3,000 likes, or 20,000 views and 10,000 likes) in association with a digital content item.

In an embodiment, when the challenge criteria specify a tiered reward system, the process may be programmed to provide the Challenge-accepter with partial rewards for partial challenge completion (e.g., $200 for 2,000 views, $500 for 4,000 views, or $1,000 for 6,000 views). In an embodiment, by interacting with program functions of app 122 in conjunction with computer system 110, the Challenge-issuer sets the reward criteria publicly before publishing the Challenge and cannot edit the reward criteria once the Challenge has been published. In an embodiment, under control of program functions of app 122 in conjunction with computer system 110, the Challenge-issuer sets a publicly viewable total budget they are willing to pay content creators who complete the Challenge, and the Challenge automatically concludes when that total budget is exhausted.

Referring again to FIG. 2A, at step 204, the Challenge corresponding to the established challenge settings is published. "Published," in this context, means distributed computing system 110 changing a state value of the Challenge in internal database 116. After publication, client computing devices 120 of other accounts that issue search queries may receive result sets of Challenges that include the published Challenge. Stated otherwise, internal database 116 is programmed to filter result sets to include only Challenge records that are in the Published state.

Thus, once a Challenge is published, other client computing devices 120 of user accounts may view the Challenge and the digital content item that was identified by the Challenge-issuer, and attempt to complete the Challenge. In embodiments, distributed computer system 110 is programmed to post information about the Challenge online to one or more web pages associated with the platform. These pages may include a home page that distributed computer system 110 is programmed to serve to client computing devices 120, accounts, and platform users upon logging in to the platform and a "Challenge page" that lists a plurality of ongoing and/or upcoming Challenges. The distributed computer system 110 is programmed to generate posted information about a Challenge that includes the name of the Challenge-issuer, the challenge criteria including the reward criteria and budget, a start date, an end date after which submissions may no longer be made by Challenge-accepters, an introductory description comprising a video, or other information. In embodiments, platform users may dynamically track budget status and the submissions of content creators who have completed the challenge.

At step 204, in an embodiment, publishing a challenge may comprise distributed computer system 110 notifying user accounts that the Challenge is available by email messages, direct messages on social media platforms, text messages, or other electronic communications. In embodiments, when a user account accesses distributed computer system 110, the distributed computer system 110 is programmed to transmit a list of available Challenges in a "Challenge Feed", which may be on the "Challenge page" that is transmitted to the client computing device 120. In some embodiments, the contents of the Challenge Feed are filtered and modified specifically for a particular user account or client computing device 120 based at least in part on content types with which the Challenge-issuer and platform user are associated. In an embodiment, generating the Challenge Feed may be based on output of a machine learning algorithm operating to evaluate data in a graph that is digitally stored in memory of distributed computer system 110. In an embodiment, the graph models content types and creators are as nodes, and a change in followers is modeled as an edge joining a first creator node to a second creator node.

Referring again to FIG. 2A, in step 206, the method is programmed to execute a verification of completion of the Challenge for one or more Challenge-accepters. In embodiments, completing the Challenge requires a particular user account or client computing device 120 creating a digital object that is a digital composition comprising both the digital content identified by the Challenge-issuer and new digital content created by the Challenge-accepter. In embodiments, step 206 comprises distributed computer system 110 programmatically checking whether the digital object has been uploaded to a specified third-party service and whether the digital object has received a required minimum number of views and/or likes as specified in the Challenge criteria. Examples of third-party services include TIKTOK and INSTAGRAM.

In various embodiments, verification at step 206 is performed manually by the Challenge-issuer, the platform, other platform users, or a combination thereof, including signaling the distributed computer system 110 with input specifying that verification has occurred. In response, distributed computer system 110 is programmed to update internal database 116 to mark the Challenge as verified in relation to a particular Challenge-accepter account.

In embodiments, any time after creating digital content that satisfies the specifications of the Challenge, a Challenge-accepter may use app 122 to submit a link to a social media website at which the particular content item is hosted. In embodiments, the distributed computer system 110 may periodically access metadata associated with the submitted link to determine a current number of views or likes using API calls, comparing the metadata received in response to the challenge settings or criteria. After the content receives the requisite number of views or likes to achieve a reward tier or complete reward, the distributed computer system 110 is programmed to notify the Challenge-accepter and update the progress of the Challenge budget on the platform. In embodiments, the Challenge accepter may instead only submit a link to the hosted content after the digital content has received the requisite number of views or likes to achieve a reward tier or complete reward.

At step 208, method 200 is programmed to distribute rewards to content creators or accounts that successfully complete the Challenge. In an embodiment, step 208 comprises distributed computer system 110 programmatically initiating an electronic digital payment to the account of a user associated with a validated completion of the Challenge. In various embodiments, payments may be distributed by electronic check, or programmatically ordered through a payment processor intermediary such as STRIPE, PAYPAL, or another intermediary using APIs or function calls or method invocations provided by those services. In an embodiment, prior to interacting with the method, distributed computer system 110 is programmed to prompt content creators who wish to send requests to add credit card information via internal database 116 or the third party payment services before they send any requests, and content creators that will receive payments set up deposit information. In some embodiments, card payments are charged only after an administrator associated with distributed computer system 110 conducts a manual check to verify that a particular digital content item has been posted. Once it is verified, the card is charged, and the collaboration party will have access to the funds.

Payment may be collected or distributed in the form of ETHER (ETH), BITCOIN, or another cryptocurrency. In an embodiment, distributed computer system 110 is programmed to support payment distribution via tokens which are a type of currency unique to the platform. These tokens may represent value on the platform without being legal tender, allowing a freer flow of currency throughout the platform and between the buy-side and the sell-side. Thus, a platform user that earns money through a Challenge may easily reinvest that money into growing his or her user base through the Broadcast function (as explained further herein, particularly in section 2.2). The platform operators may take a commission based on the Challenge budget or the amount of rewards distributed, or as a flat fee, at any point in the process. In embodiments, payment is deposited in a digital wallet associated with a user account of the user being paid.

Figure 2B:
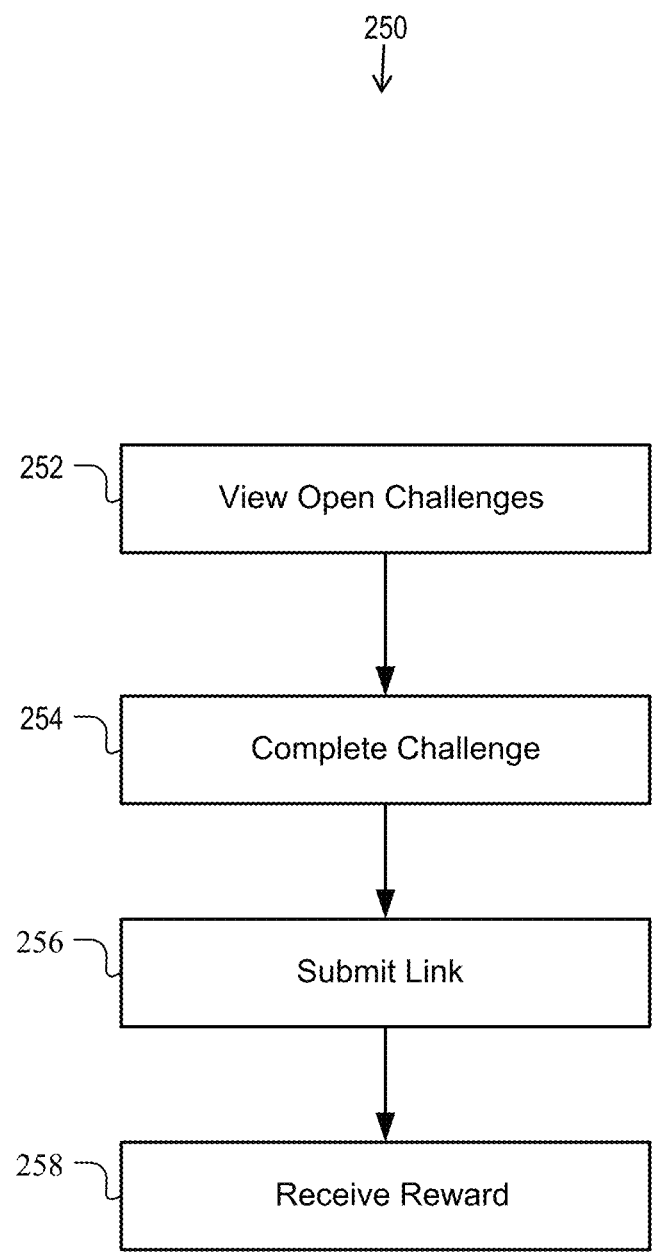
FIG. 2B illustrates an example process for completing Challenges from a sell-side perspective, in an embodiment.

FIG. 2B illustrates an example process for completing Challenges from a sell-side perspective, in an embodiment. "Sell-side," in this context, refers to operations associated with accounts that view and select Challenges, complete Challenges, submit evidence of completing Challenges, and receive electronic rewards.

In FIG. 2B, in an embodiment, a Challenge completion method 250 begins at step 252 in which a content creator views open challenges by interactively communicating with the distributed computer system 110 using the client computing device 120 to request and generate a list of Challenges that have been published. In some embodiments, at step 252, a client computing device 120 may request and receive a view of open Challenges that are available on the platform. Open Challenges available for completion may be viewed in a graphical user interface (GUI) rendered using app 122 on client computing device 120. Project management logic 102 may be programmed to generate and transmit, to app 122, instructions that can render a GUI in which viewable Challenges can be filtered by associated content type, reward amount, start date, end date, Challenge-issuer name, posting date, budget data, or based on other criteria. For example, distributed computing system 110 may be programmed to generate and transmit dynamic HTML datasets for display and rendering via app 122 to display hyperlinks and/or GUI widgets which, when selected via input at client computing device 120, cause reordering and/or redisplaying Challenge data. Open and available Challenges may also be configured for search by keyword or based on the aforementioned filter types.

Figure 4:
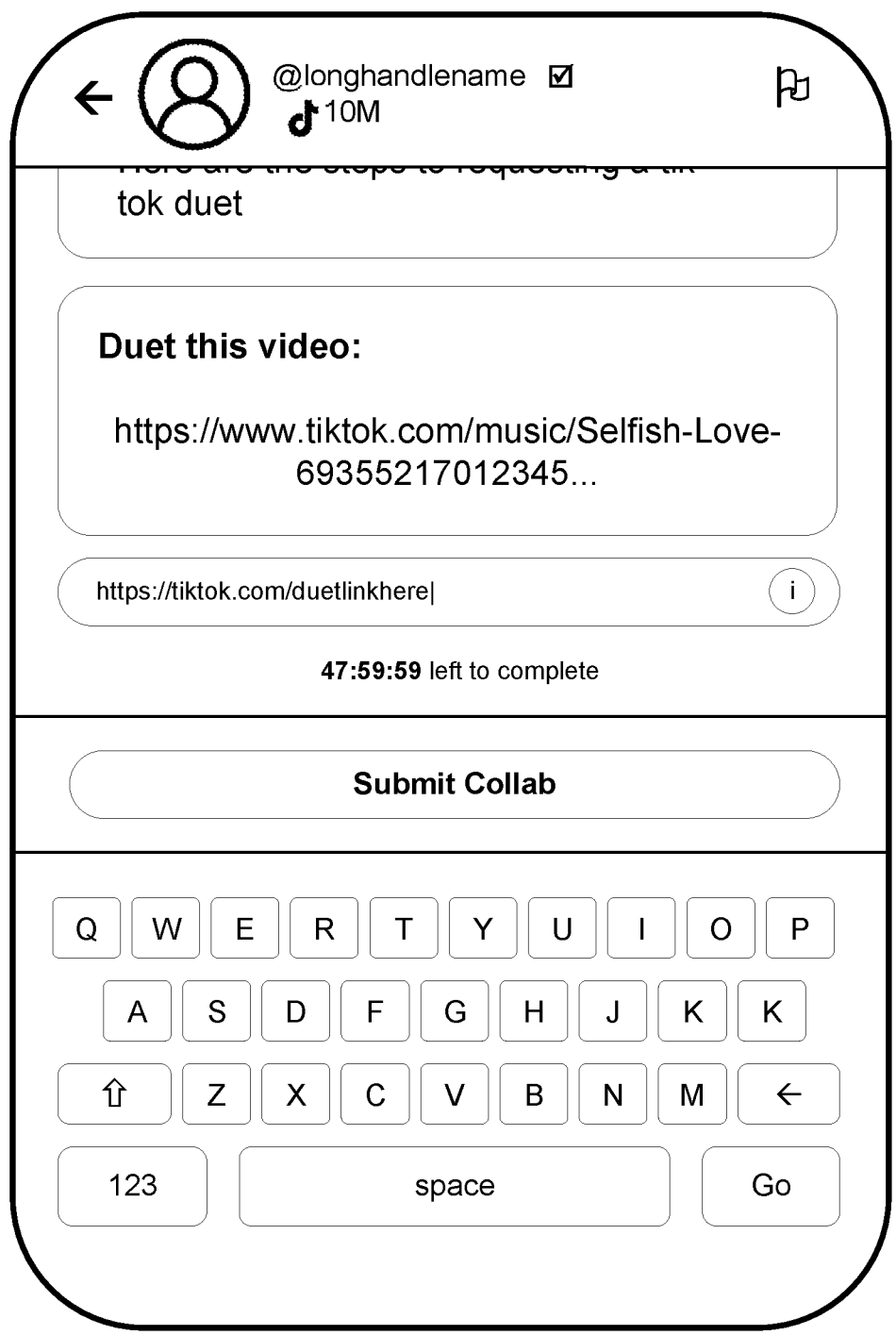
FIG. 4 illustrates an example user interface for submitting a collaboration as part of a Challenge or Broadcast process, in an embodiment.

In FIG. 2B, in an embodiment, method 250 may progress from step 252 to step 254, in which a content creator completes a challenge by creating a digital object/digital composition that integrates the Challenge-issuer's identified content and the Challenge-accepter's newly created digital content. To complete the Challenge, the content creator may use tools provided by the platform's digital creation logic 104 to create, produce, or mix content. These tools may comprise video editing tools, sound editing tools, image editing tools, text editing tools, markup tools, post-production tools, file compression or editing tools, metadata editing tools, tools for creating subtitles or closed captioning (CC), or other digital editing, production, remixing, or publication tools. The integrated tools provided by the platform may allow for a seamless flow from collaboration initiation to Challenge completion. Alternatively, the Challenge-accepter may also use his or her own tools to create the composition and then upload, to the platform, a final version [which the platform may publish on behalf of the Challenge-accepter at a content host 160 website], or a link to a final version posted to a social media website. FIG. 4 illustrates an example user interface for submitting a collaboration as part of a Challenge process, in an embodiment.

In FIG. 2B, in an embodiment, method 250 may progress from step 254 to step 256, wherein the Challenge-accepter submits a link to the digital object/digital composition designed to satisfy the requirements of the Challenge. The link may be a URL or other identifying information used to pinpoint a location of the digital content. Before receiving his or her reward, the Challenge-accepter must wait for a verification that the Challenge was completed successfully.

In various embodiments, the verification is done by the Challenge-issuer, the platform, other platform users, or a combination thereof.

In FIG. 2B, in an embodiment, method 250 may progress from step 256 to step 258, wherein a content creator that successfully completes that challenge receives a reward as described further herein. The reward may be processed by the platform quickly, potentially in only one to two business days due to the streamlined nature of the process.

2.2 Broadcast Function

Figure 3A:
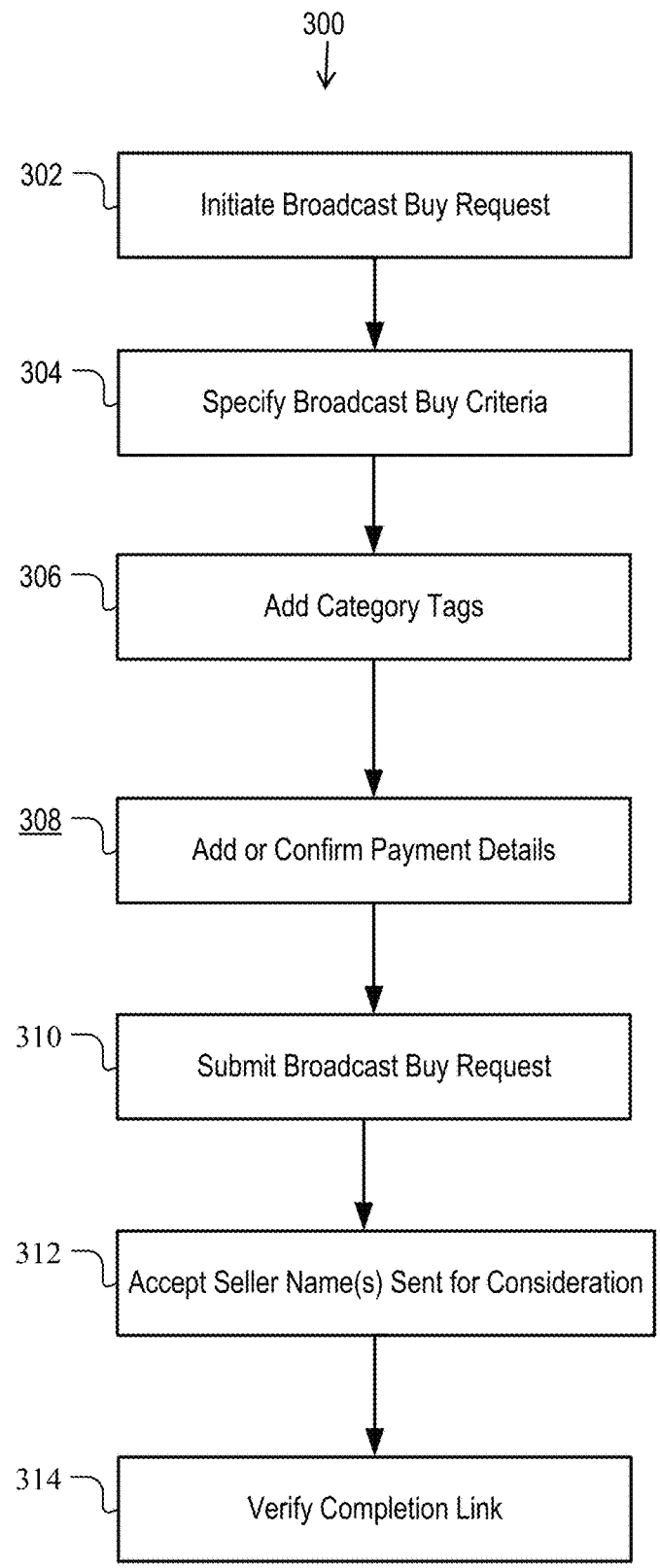
FIG. 3A illustrates an example process for creating a Broadcast request from a buy-side perspective, in an embodiment.

FIG. 3A illustrates an example process for creating a Broadcast request from a buy-side perspective, in an embodiment.

In FIG. 3A, in an embodiment, a Broadcast request method 300 begins at step 302, wherein a Broadcast buy request is initiated by a platform user communicating with distributed computer system 110 using a client computing device 120. To initiate a Broadcast buy request, a platform user ("Broadcast buyer") may transmit input, such as graphical input, for example by the user clicking a button on a GUI displayed using app 122 on a display of client computing device 120. Each selection of a button or control of the GUI of app 122 discussed in this section causes transmitting a signal to distributed computer system 110 via network 100, and in response, the distributed computer system is programmed to execute a responsive function or action as further described in this section.

Any platform user with an active account may be able to initiate a Broadcast buy request. A goal of a Broadcast may be to collaborate with other content creators, especially content creators with a large or active fan base, to create collaborative content. When the created collaborative content is eventually displayed, shared, viewed, or liked on a social media platform, the Broadcast buyer may consequently grow his or her own audience or base of fans or followers. However, in past approaches, the ability of one account to discover another account for purposes of connection or collaboration has been limited. Unlike past approaches, the method of FIG. 3A is programmed to create logical connections of accounts using efficient network message transmission and to minimize the use of network bandwidth.

In FIG. 3A, in an embodiment, method 300 may continue from step 302 to step 304, in which the Broadcast buyer may specify a plurality of Broadcast buy criteria associated with the Broadcast buy request. The criteria may comprise a social media platform at which that the content will be created such as TIKTOK, INSTAGRAM, or another social media platform or type of content host 160. The criteria may comprise a type of collaboration such as a DUET, a stitch, a comment, or sound, as previously described in other sections. In one embodiment, an account or client computing device 120 may specify the aforementioned criteria by selecting a corresponding button in the GUI of app 122 and then clicking a "Next" button, or by another method.

In embodiments, the Broadcast buy criteria may comprise a range of numbers of follower accounts that the target content creator collaborator has on a social media platform. Examples include between ten thousand and ten million followers, or between one million and two million followers. The Broadcast buyer may select the range by dragging a slider on the GUI of app 122, the slider comprising a left bound representing a minimum number of desired followers and a right bound representing a maximum number of desired followers. The slider may be overlaid on a graph, such as a histogram, the histogram depicting a number of potentially available Broadcast sellers with various associated follower ranges.

In embodiments, as the platform user narrows the Broadcast buy criteria at step 302 by specifying a desired follower count of a target Broadcast seller, or by specifying other criteria, a list may populate in a subframe of the GUI. In an embodiment, the list comprises of potentially available content creators to collaborate with, that is, content creators that meet all of the specified criteria. The list may be text based, graphical, or a combination. The list may comprise thumbnail images of content creators who are potentially available for collaboration, and other pertinent information associated with those creators, including social media handles and follower counts. In an embodiment, distributed computer system 110 is programmed to obtain the foregoing metrics via API calls to the content host 160 or social media sites.

In embodiments, the Broadcast buyer associated with an account or client computing device 120 may click on one of the thumbnail images in the GUI, and in response, distributed computer system 110 is programmed to transmit more information associated with the creator or to move forward with sending a Broadcast buy request to that particular content creator. In other embodiments, at any time, the Broadcast buyer may be able to click on the subframe of the GUI of app 122 containing the thumbnail images to obtain an enlarged or maximized view of the portraits, seeing more or potentially all Broadcast sellers that the current criteria are currently targeting. In embodiments, the platform user may click a "Next" button in the GUI of app 122 to move on to specifying more Broadcast buy criteria after making a selection on the follower count slider.

In embodiments, the Broadcast buy criteria may comprise a total Broadcast buy budget that the platform user is willing to spend on the initiated buy. The budget may be specified, for example, by dragging a slider in the GUI of app 122 or by typing in a total maximum amount of money that the Broadcast buyer might be willing to spend on the initiated buy. The budget slider may move in increments such as $25 increments. If the Broadcast buyer's currently specified budget is low compared to the specified follower count criteria, then a warning may be displayed in the GUI. The warning may comprise a color change of text displayed in the GUI or a new text string displayed in the GUI, such as "*low—reaches 1 creator".

In FIG. 3A, in an embodiment, method 300 may continue from step 304 to step 306, in which a Broadcast buyer may add content tags to his or her initiated Broadcast buy request by interacting with the GUI of app 122. Content tags may comprise hashtags (e.g., "#style", "#comedy", "stunt", or "flip") which may be used to help identify creators (Broadcast sellers) associated with the Broadcast buyer's self-identified brand. The tags may be selected from menus, such as dropdown menus, or selected in another way such as typing a desired tag into a text field, the text field potentially using autocomplete or suggestions. In response, distributed computer system 110 is programmed to store data identifying the tags in association with records identifying the content items.

In embodiments, distributed computer system 110 is programmed to suggest content creators, as possible collaboration partners, to the Broadcast buyer. In an embodiment, distributed computer system 110 is programmed to determine suggestions of other accounts as collaboration partners by executing a machine learning algorithm operating on a digitally stored graph data structure in which content types and creators are represented as nodes on the graph and an increase in followers is modeled as an edge joining one creator node to another creator node.

In FIG. 3A, in an embodiment, method 300 may continue from step 306 to step 308, in which a Broadcast buyer may add or confirm payment details by interacting with the GUI of app 122. In embodiments, the Broadcast buyer may instruct distributed computer system 110 to pay for a Broadcast collaboration using eCheck, or through Stripe, PayPal, or another payment intermediary. Payment may be collected in the form of Ether (ETH), bitcoins, or another cryptocurrency. As described further herein, payment may also be made in the form of native tokens managed by distributed computer system 110.

In embodiments, at step 308, a Broadcast buyer may specify a form of payment for a future charge, authorize a charge, or pay upfront. In embodiments, a payment may be made or authorized in advance, and then refunded if the Broadcast transaction is not successfully completed. Payment methods may be saved in distributed computer system 110 so that they can be reused in the future without the platform user needing to reenter all of the details. In one example, payment methods are added using a colored "Add" button of the GUI of app 122.

In FIG. 3A, in an embodiment, method 300 may continue from step 308 to step 310, wherein a Broadcast buyer may submit an initiated and customized Broadcast buy request. This submission may occur from the same page in the GUI of app 122, or the same webpage served from distributed computer system 110, where the payment details were entered or from another location. Before submitting the initiated and customized Broadcast buy request, a Broadcast buyer may submit a link to distributed computer system 110, comprising digital content that the Broadcast buyer wishes Broadcast sellers to use in creating a collaboration such as a duet, stitch, comment, or sound. The link may be a URL that points to a video, a digital audio file, or another type of digital content. The link may be submitted by typing or pasting the URL into a text field and submitting graphical input on the GUI of app 122, which transmits the URL to distributed computer system 110. After the request has been submitted, distributed computer system 110 is programmed to transmit to the Broadcast buyer a plurality of details comprising the specified criteria on in the GUI of the app 122, as well as a counter tracking a number of content creators or Broadcast sellers who signal, through the platform, that they are interested in collaborating with the requester on the submitted Broadcast buy request.

In FIG. 3A, in an embodiment, method 300 may continue from step 310 to step 312, wherein a Broadcast buyer accepts one or more seller names sent for consideration. One or more sellers may respond to the Broadcast buy request. The distributed computer system 110 is programmed to inform the Broadcast buyer of these responses on an inbox page as described further herein or by email, text message, or direct message, or through another page accessible through the platform. Each of the responses may comprise the name of the seller and other relevant information about the seller. In an embodiment, by accepting a seller name sent for consideration, the Broadcast buyer concludes establishing a deal with that seller.

In FIG. 3A, in an embodiment, method 300 may continue from step 312 to step 314, in which distributed computer system 110 is programmed to verify one or more verification links. As described further herein, in embodiments, distributed computer system 110 is programmed to verify a collaboration link or verification link or verification occurs via operators, employees, or contractors associated with distributed computer system 110. In embodiments, the collaboration is verified by the Broadcast buyer that created the relevant buy request. Verifying the collaboration may comprise, among other things, verifying that a content composition viewable at a submitted verification link meets the Broadcast buyer's specifications (e.g., that it is the correct content type, that it is on the correct social media platform, and that it properly integrates the digital content supplied by the Broadcast buyer for the collaboration with Broadcast seller content).

Figure 3B:
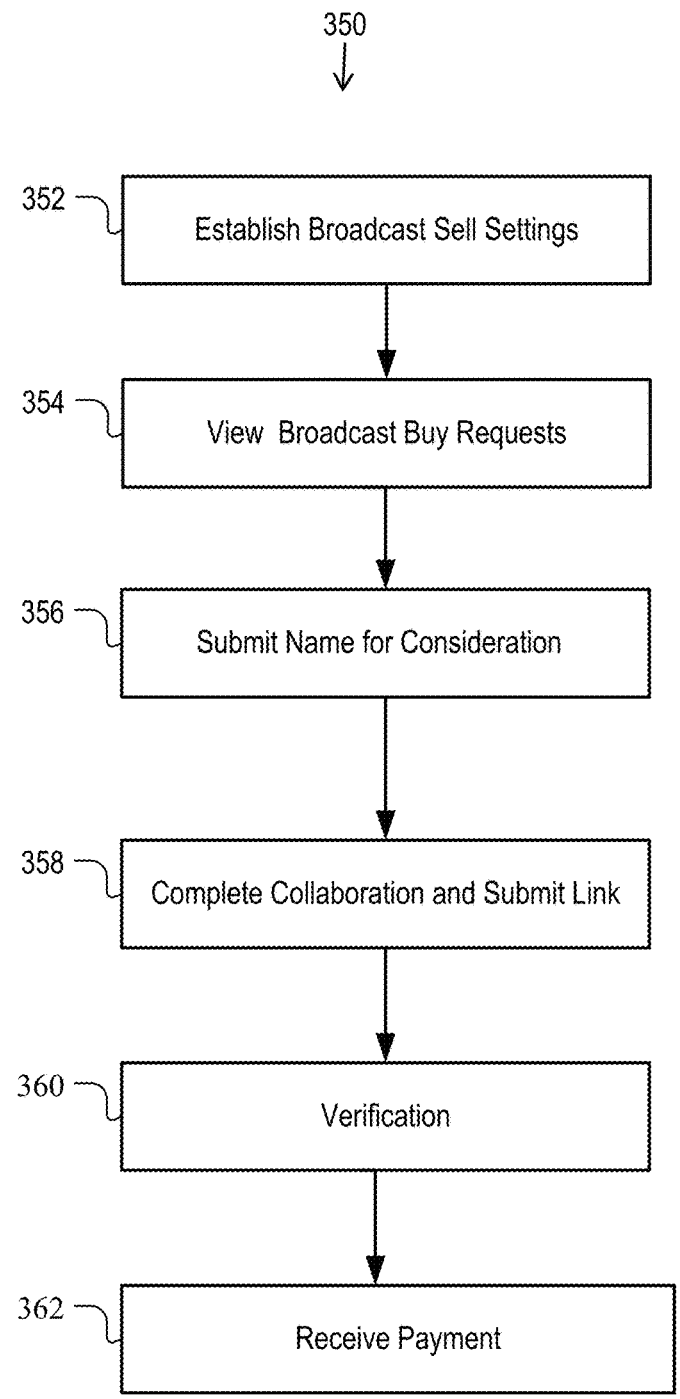
FIG. 3B illustrates an example process for completing a Broadcast request from a sell-side perspective, in an embodiment.

FIG. 3B illustrates an example process for completing a Broadcast request from a sell-side perspective, in an embodiment. FIG. 3B depicts the same general process as FIG. 3A, but from a different perspective.

In FIG. 3B, in an embodiment, a Broadcast acceptance method 350 begins at step 352, in which Broadcast sell settings are established by a platform user ("Broadcast seller") by communicating with the distributed computer system 110 using a client computing device 120 and/or app 122. In an embodiment, distributed computer system 110 is programmed to create and manage, for content creators with an account on the platform, a profile page comprising a profile picture, information such as a number of followers of the content creator on various social media platforms and/or video hosting platforms and one or more links, including a link to Challenges and a link to "sell settings" for Broadcasts. Thus, distributed computer system 110 is programmed to receive from a Broadcast seller and update Broadcast sell settings by first navigating to a settings page accessible by clicking a button in a GUI of app 122 displaying the Broadcast seller's account profile page.

In an embodiment, the Broadcast sell settings may comprise sell prices for various types of content further segregated by social media platform. For example, the Broadcast seller may specify a price for a duet, a comment, or a sound on TIKTOK is $25, $100, or $250 respectively, while a price for a remix, a comment, or a sound on INSTAGRAM is $20, $115, or $250 respectively. The foregoing are examples only: types of collaborative content can vary, and types of collaborative content are further described herein with greater specificity. I embodiments, a sell settings page may comprise a toggle for whether the Broadcast seller is currently accepting sell requests. The distributed computer system 110 may be programmed to support more granular toggles corresponding to availability for requests related to specific social media platforms, video hosting platforms, or other content hosts 160.

In FIG. 3B, in an embodiment, method 350 may continue from step 352 to step 354, in which a Broadcast seller may view one or more received Broadcast buy requests. In an embodiment, one way that a Broadcast seller can view received Broadcast buy requests is by clicking a notifications icon accessible from the account profile page displayed in the GUI. Clicking the notifications icon can lead the platform user to an inbox page which displays both Broadcast's the platform user has purchased, and the received Broadcast buy requests. In an embodiment, the user's purchased Broadcasts are displayed at the top of the page, followed by received Broadcast buy requests the user has already accepted, followed by new incoming Broadcast buy requests. In an embodiment, the newly received Broadcast buy requests are ordered such that the most recently received requests are nearer the top of the page, but other orderings are possible. The requests may comprise information such as the handle and number of followers of the requester, the type of collaboration requested, an offered price, a social media platform, and a time remaining until the request expires. In embodiments, the Broadcast seller may be informed of new Broadcast buy requests in another way, such as by email, text message, or direct message, or through another page accessible through the platform.

In FIG. 3B, in an embodiment, method 350 may continue from step 354 to step 356, wherein a Broadcast seller may submit his or her name for consideration responsive to a Broadcast buy request. In an embodiment, the Broadcast seller may click on a buy request in the inbox to see additional information associated with the request, including a link to content submitted by the requester for the collaboration (e.g., a video) and how many other creators already responded to the request. The additional information may also comprise a number of hours the seller will have to complete the collaboration (e.g., 48 hours) once the buyer accepts, finalizing the deal. In an embodiment, the Broadcast seller may submit his or her name for consideration by clicking on a "Submit Name" button in the GUI. Responsive to clicking the "Submit Name" button, the platform may display a confirmation message in the GUI such as "You've accepted this Broadcast!".

In some instances, in step 356, the Broadcast buyer may reject the name submission, never see the name submission, or choose not to use the Broadcast seller by not responding, ending method 350. In other instances, in step 356, the Broadcast buyer may choose to move forward with the Broadcast seller. If the buyer chooses to move forward with the seller, then the Broadcast seller may be informed of this acceptance on the inbox page or by email, text message, or direct message, or through another page accessible through the platform.

In FIG. 3B, in an embodiment, method 350 may continue from step 356 to step 358 when a Broadcast buyer chooses to move forward with a Broadcast seller, wherein the Broadcast seller may complete a collaboration and submit a verification link. Completing the collaboration may comprise creating a digital content composition using digital content accessible via a link that the Broadcast buyer submitted in step 310 (FIG. 3A). The type of composition that the seller creates is determined by the Broadcast buyer as described herein and may comprise a duet, a stitch, a comment, or a sound. Once the digital content composition has been created by the seller and posted to the desired social media platform (e.g., TIKTOK or INSTAGRAM) or other content host 160, then the Broadcast seller may submit a verification link comprising a pointer to the hosted composition to verify task completion. FIG. 4 illustrates an example user interface for submitting a collaboration (verification link) as part of a Broadcast process, in an embodiment.

In FIG. 3B, in an embodiment, method 350 may continue from step 358 to step 360, in which the collaboration/verification link is verified. In embodiments, the collaboration is verified by the platform or by its operators, employees, or contractors. In embodiments, the collaboration is verified by the Broadcast buyer that created the relevant buy request. Verifying the collaboration may comprise verifying that a content composition viewable at a submitted verification link meets the Broadcast buyer's specifications (e.g., that it is the correct content type, that it is on the correct social media platform, and that it properly integrates the digital content supplied by the Broadcast buyer for the collaboration with Broadcast seller content).

In FIG. 3B, in an embodiment, method 350 may continue from step 360 to step 362, wherein a Broadcast seller may receive payment for his or her collaboration [after a verification link is verified]. In embodiments, the Broadcast seller may receive payment for a completed Broadcast collaboration via eCheck, or through Stripe, PayPal, or another payment intermediary. Payment may be collected in the form of Ether (ETH), bitcoins, or another cryptocurrency. As described further herein, payment may also be made in the form of native tokens. In embodiments, payment is deposited in a digital wallet associated with a user account of the user being paid.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
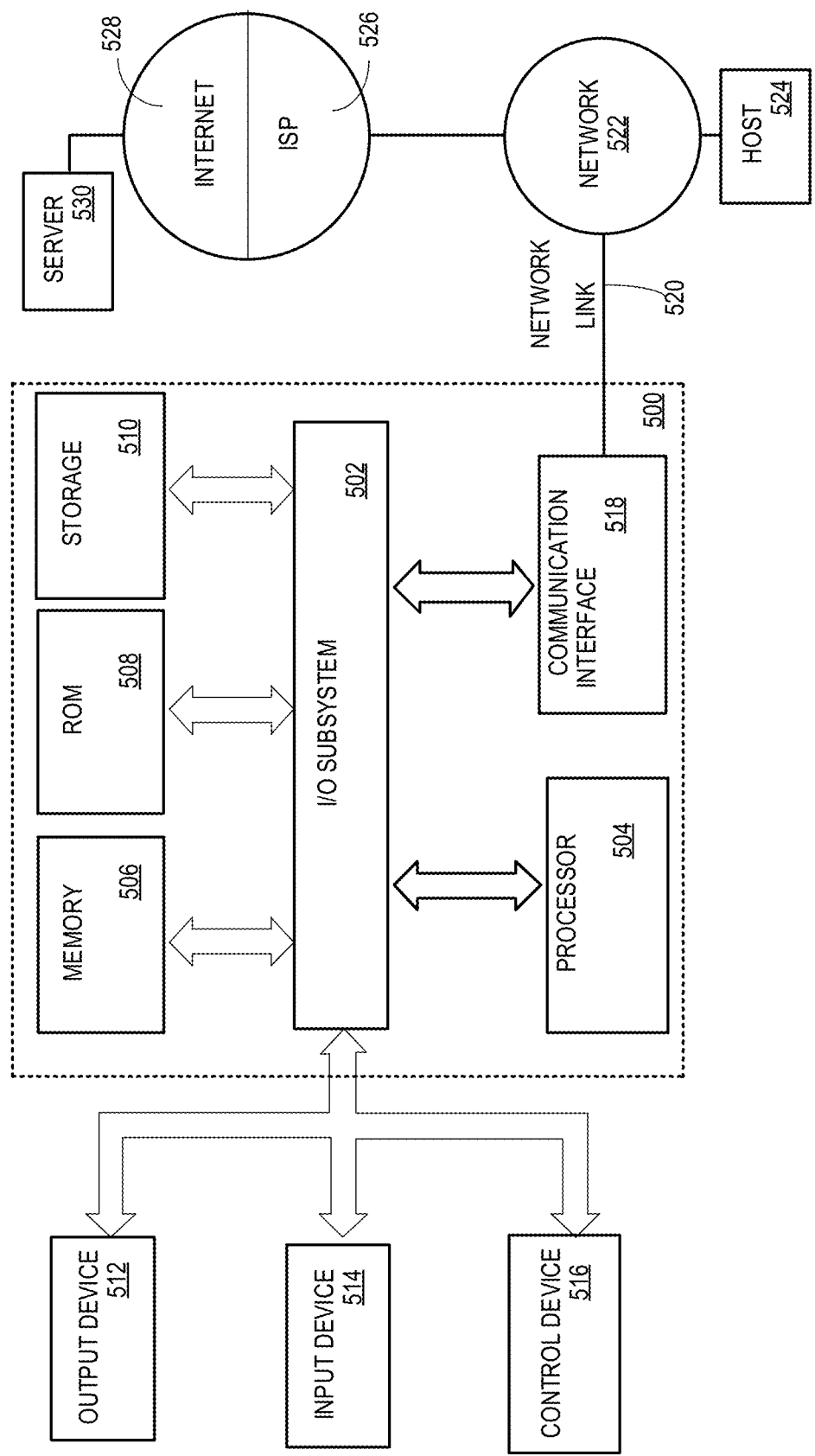
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing syste0m that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, Internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using one or more processors, comprising:
   receiving, from each of a plurality of first client computing devices, access to a first file from among a plurality of first files, each first file respectively comprising digital content and associated with a specification;
   generating, based on verifying a published state in an internal database, an online listing of the plurality of first files received from the plurality of first client computing devices;
   providing, to a second client computing device, a curated display of a subset of the plurality of first files respectively associated with the plurality of first client computing devices, the curated display being curated for the second client computing device based on a content type of the plurality of first files, the curated display being displayed via a graphical user interface (GUI) of the second client computing device, the second client computing device disconnected from the plurality of first client computing devices prior to providing the curated display;
   receiving, from the second client computing device, a selection comprising a selected first file from the subset of the plurality of first files, wherein the providing, to the second client computing device, of the curated display of the subset of the plurality of first files, and the receiving, from the second client computing device, of the selection, utilizes a reduced amount of network bandwidth relative to non-use of the curated display of the subset of the plurality of first files;
   providing, to the second client computing device and based on the specification associated with the selected first file, a computational tool for generating a second file, the second file comprising a digital composition that at least partially includes digital content associated with the selected first file;
   transmitting, based on the specification associated with the selected first file, the second file to a third-party computing platform;
   periodically accessing the third-party computing platform and verifying, based on the specification associated with the selected first file and using an Application Programming Interface (API) call, one or more performance statistics associated with the second file, wherein the verifying includes accessing metadata associated with the second file that indicates a current number of views of the second file based on a number of the API calls; and
   initiating, based on the one or more performance statistics satisfying one or more threshold criteria, a transactional operation associated with generating the second file, wherein the one or more performance statistics satisfying one or more threshold criteria includes the current number of views of the second file based on the number of the API calls satisfying one or more of the one or more threshold criteria.

2. The computer-implemented method of claim 1, wherein the computational tool for generating the second file comprises at least one of video editing tools, sound editing tools, image editing tools, text editing tools, markup tools, post-production tools, file compression tools, metadata editing tools, tools for creating subtitles, or tools for creating closed captioning (CC).

3. The computer-implemented method of claim 1, wherein the specification associated with the first file includes a challenge type comprising one of a duet, a stitch, a sound, or a comment.

4. The computer-implemented method of claim 1, the specification associated with the first file including challenge criteria comprising tiered reward goals.

5. The computer-implemented method of claim 1, wherein the transactional operation includes a reward distribution comprising depositing a reward into a digital wallet, the reward comprising Ether, Bitcoin, or a unique fungible token native to the third-party computing platform.

6. The computer-implemented method of claim 5, the reward distribution being processed using blockchain recordation after verifying that the one or more performance statistics associated with the second file satisfying one or more threshold criteria, the blockchain recordation implemented using a main blockchain and a side blockchain, the side blockchain having a lower transaction cost than the main blockchain.

7. One or more non-transitory computer-readable media storing one or more sequences of program instructions which, when executed by one or more processors, cause the one or more processors to execute:
   receiving, from each of a plurality of first client computing devices, access to a first file from among a plurality of first files, each first file respectively comprising digital content and associated with a specification;
   generating, based on verifying a published state in an internal database, an online listing of the plurality of first files received from the plurality of first client computing devices;

providing, to a second client computing device, a curated display of a subset of the plurality of first files respectively associated with the plurality of first client computing devices, the curated display being curated for the second client computing device based on a content type of the plurality of first files, the curated display being displayed via a graphical user interface (GUI) of the second client computing device, the second client computing device disconnected from the plurality of first client computing devices prior to providing the curated display;

receiving, from the second client computing device, a selection comprising a selected first file from the subset of the plurality of first files, wherein the providing, to the second client computing device, of the curated display of the subset of the plurality of first files, and the receiving, from the second client computing device, of the selection, utilizes a reduced amount of network bandwidth relative to non-use of the curated display of the subset of the plurality of first files;

providing, to the second client computing device and based on the specification associated with the selected first file, a computational tool for generating a second file, the second file comprising a digital composition that at least partially includes digital content associated with the selected first file;

transmitting, based on the specification associated with the selected first file, the second file to a third-party computing platform;

periodically accessing the third-party computing platform and verifying, based on the specification associated with the selected first file and using an Application Programming Interface (API) call, one or more performance statistics associated with the second file, wherein the verifying includes accessing metadata associated with the second file that indicates a current number of views of the second file based on a number of the API calls; and initiating, based on the one or more performance statistics satisfying one or more threshold criteria, a transactional operation associated with generating the second file, wherein the one or more performance statistics satisfying one or more threshold criteria includes the current number of views of the second file based on the number of the API calls satisfying one or more of the one or more threshold criteria.

8. The one or more non-transitory computer-readable media of claim 7, wherein the computational tool for generating the second file comprises at least one of video editing tools, sound editing tools, image editing tools, text editing tools, markup tools, post-production tools, file compression tools, metadata editing tools, tools for creating subtitles, or tools for creating closed captioning (CC).

9. The one or more non-transitory computer-readable media of claim 7, wherein the specification associated with the first file includes a challenge type comprising one of a duet, a stitch, a sound, or a comment.

10. The one or more non-transitory computer-readable media of claim 7, wherein the specification associated with the first file includes challenge criteria comprising tiered reward goals.

11. The one or more non-transitory computer-readable media of claim 7, wherein the transactional operation includes a reward distribution comprising depositing a reward into a digital wallet, the reward comprising Ether, Bitcoin, or a unique fungible token native to the third-party computing platform.

12. The one or more non-transitory computer-readable media of claim 11, wherein the reward distribution is processed using blockchain recordation after verifying that the one or more performance statistics associated with the second file satisfying one or more threshold criteria, the blockchain recordation implemented using a main blockchain and a side blockchain, the side blockchain having a lower transaction cost than the main blockchain.

13. A computer system, comprising:
one or more processors;
one or more non-transitory computer-readable media that are communicatively coupled to the one or more processors and storing one or more sequences of instructions which, when executed by one or more processors, cause the one or more processors to execute:
receiving, from each of a plurality of first client computing devices, access to a first file from among a plurality of first files, each first file respectively comprising digital content and associated with a specification;
generating, based on verifying a published state in an internal database, an online listing of the plurality of first files received from the plurality of first client computing devices;
providing, to a second client computing device, a curated display of a subset of the plurality of first files respectively associated with the plurality of first client computing devices, the curated display being curated for the second client computing device based on a content type of the plurality of first files, the curated display being displayed via a graphical user interface (GUI) of the second client computing device, the second client computing device disconnected from the plurality of first client computing devices prior to providing the curated display;
receiving, from the second client computing device, a selection comprising a selected first file from the subset of the plurality of first files, wherein the providing, to the second client computing device, of the curated display of the subset of the plurality of first files, and the receiving, from the second client computing device, of the selection, utilizes a reduced amount of network bandwidth relative to non-use of the curated display of the subset of the plurality of first files;
providing, to the second client computing device and based on the specification associated with the selected first file, a computational tool for generating a second file, the second file comprising a digital composition that at least partially includes digital content associated with the selected first file;
transmitting, based on the specification associated with the selected first file, the second file to a third-party computing platform;
periodically accessing the third-party computing platform and verifying, based on the specification associated with the selected first file and using an Application Programming Interface (API) call, one or more performance statistics associated with the second file, wherein the verifying includes accessing metadata associated with the second file that indicates a current number of views of the second file based on a number of the API calls; and
initiating, based on the one or more performance statistics satisfying one or more threshold criteria, a transactional operation associated with generating the second file, wherein the one or more performance statistics satisfying one or more threshold criteria includes the current number of views of the second file based on the number of the API calls satisfying one or more of the one or more threshold criteria.

14. The computer system of claim 13, wherein the computational tool for generating the second file comprises at least one of video editing tools, sound editing tools, image editing tools, text editing tools, markup tools, post-production tools, file compression tools, metadata editing tools, tools for creating subtitles, or tools for creating closed captioning (CC).

15. The computer system of claim 13, wherein the specification associated with the first file includes a challenge type comprising one of a duet, a stitch, a sound, or a comment.

16. The computer system of claim 13, wherein the specification associated with the first file includes challenge criteria comprising tiered reward goals.

17. The computer system of claim 13, wherein the transactional operation includes a reward distribution comprising depositing a reward into a digital wallet, the reward comprising Ether, Bitcoin, or a unique fungible token native to the third-party computing platform.

18. The computer system of claim 17, wherein the reward distribution is processed using blockchain recordation after verifying that the one or more performance statistics associated with the second file satisfying one or more threshold criteria, the blockchain recordation implemented using a main blockchain and a side blockchain, the side blockchain having a lower transaction cost than the main blockchain.

* * * * *